Aug. 7, 1923.                                                                          1,464,202
                              G. F. HAUF
                             FEED TROUGH
                        Filed Aug. 10, 1921           2 Sheets-Sheet 2
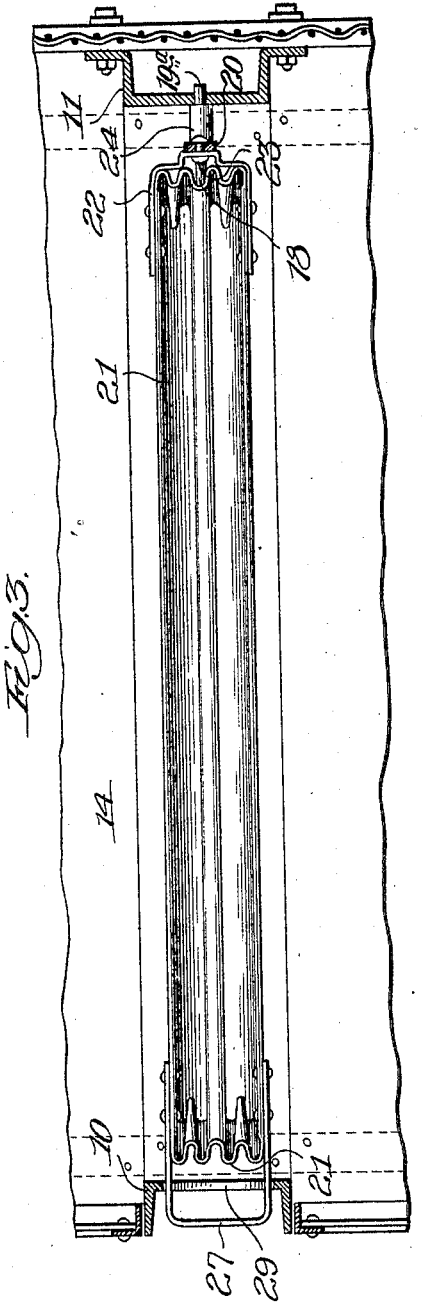
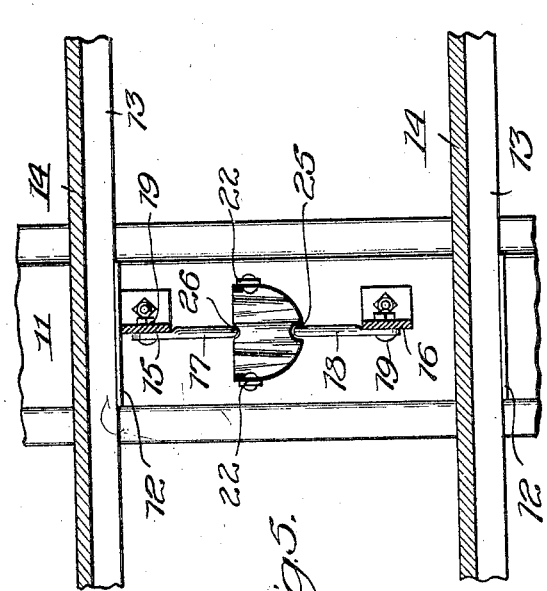
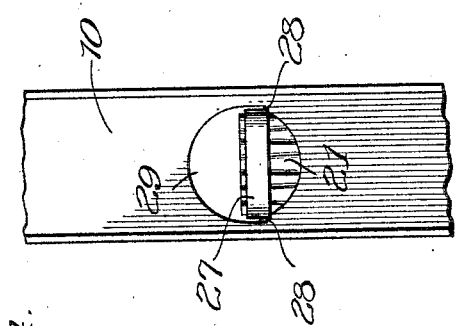
Inventor:
George F. Hauf Patented Aug. 7, 1923.

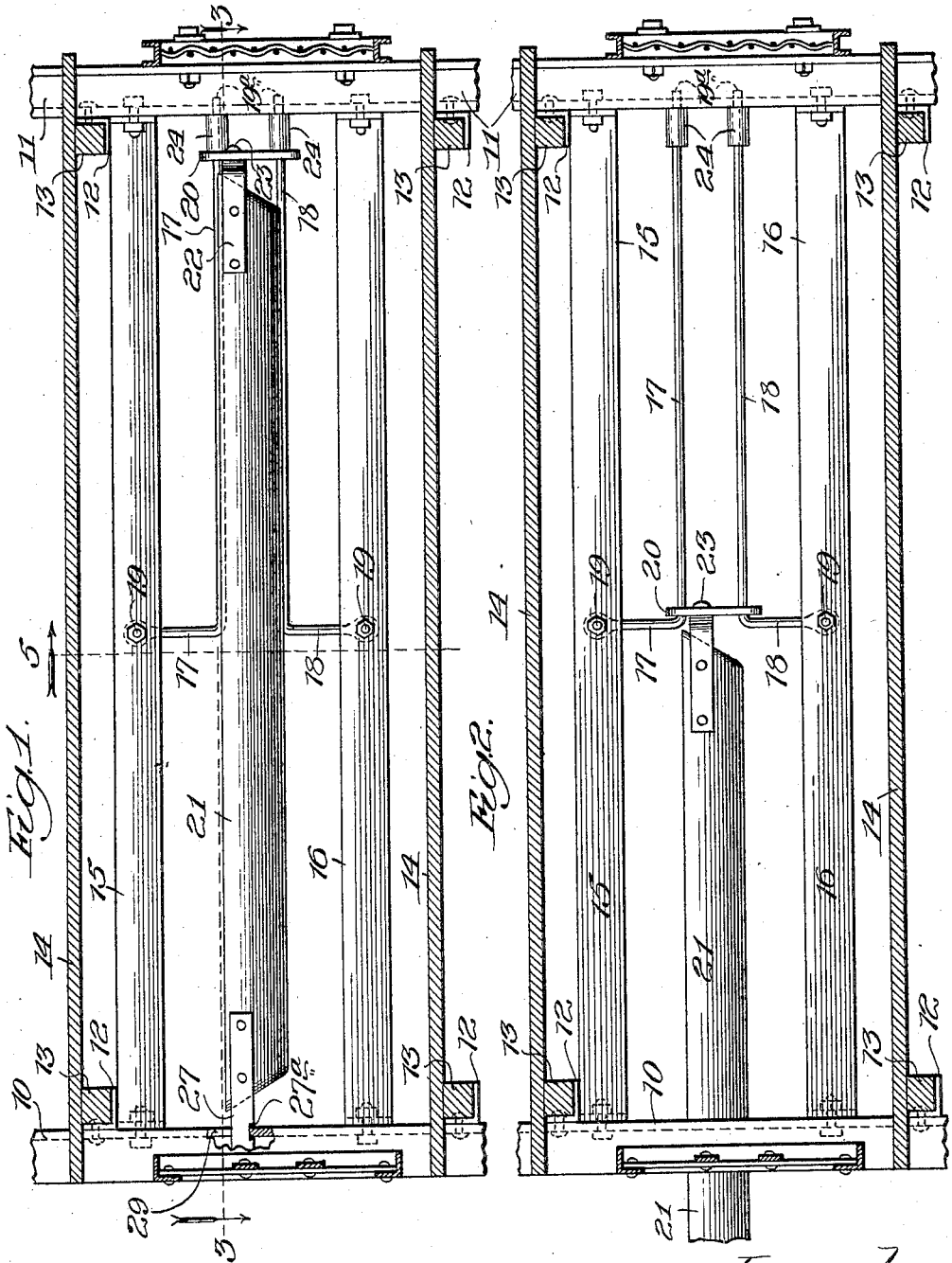

1,464,202

UNITED STATES PATENT OFFICE.

GEORGE F. HAUF, OF CHICAGO, ILLINOIS, ASSIGNOR, BY MESNE ASSIGNMENTS, TO EQUIPMENT DEVICES COMPANY, A CORPORATION OF MAINE.

FEED TROUGH.

Application filed August 10, 1921. Serial No. 491,165.

*To all whom it may concern:*

Be it known that I, GEORGE F. HAUF, a citizen of the United States, residing at c/o Live Poultry Transit Co., 1209 Fisher Bldg., Chicago, in the county of Cook and State of Illinois, have invented a new and useful Improvement in Feed Troughs, of which the following is a specification.

This invention relates to feed troughs and is particularly adapted to be used in cars for shipping live poultry, having coops arranged in tiers along each side of the car with a central aisle between. This invention is fully described in the following specification and shown in the accompanying drawings, in which:

Figure 1 is a vertical transverse section through one of the coops showing the feed trough pushed in;

Fig. 2 is a similar view showing the feed trough drawn into the aisle;

Fig. 3 is a horizontal view of the feed trough on the line 3—3 of Fig. 1;

Fig. 4 is a partial front elevation of the aisle post; and

Fig. 5 is a partial vertical section on the line 5 of Fig. 1.

The coops are supported upon aisle posts 10 and side posts 11 which have angle irons 12 riveted thereto, to which are secured nailing strips 13 to which in turn are nailed the floor boards 14.

Top and bottom slats 15 and 16 respectively are secured between the posts 10 and 11. Top and bottom guides or guide rods 17 and 18 are secured rigidly to the upper and lower slats 15 and 16 respectively near the centers by means of bolts 19. The outer ends 19ª of these rods pass through openings in the side posts 11. A slide 20 has holes which fit over the parallel horizontal portions of the guide rods 17 and 18.

A trough 21 has a U-shaped bar 22 secured at its outer end, which is hingedly mounted upon the slide 20 by means of a bolt or rivet 23. Collars 24 are placed upon the outer ends of the rods 17 and 18 so as to prevent a chicken's head from being caught and crushed between the slide 20 and the side posts 11.

The trough 21 has a deep longitudinal groove 25 at the bottom as shown in Fig. 5 which fits over the lower guide rod 18 and a notch 26 at the upper outer end of the trough which fits beneath the upper guide rod 17.

The inner or aisle end of the trough 21 as shown in Fig. 4 is provided with a U-shaped handle 27 which rests upon ledges 28 in the sides of the opening 29 which are formed in the aisle posts 10. Notches 27ª are formed in the handle 27 so as to prevent longitudinal movement of the trough.

The ends of the coops may be closed in any desired manner.

When it is desired to dump the trough preparatory to refilling with water or feed, the operator grasps the handle 27, lifting the trough clear of the notches 27ª and draws it endwise through the opening 29 until it assumes the position shown in Fig. 2 in which the slide 20 strikes the bent ends of the guide rods 17 and 18. Until this point is reached the trough 21 cannot be turned for the reason that the grooves 25 and 26 engage the horizontal portions of the guide rods 17 and 18. When, however, the trough has reached the position shown in Fig. 2 the trough is drawn clear of the guides 17 and 18 and is free to turn about the rivet 23. This trough is preferably made with a semi-cylindrical bottom and with the rivet 23 substantially at the center of the circle.

With the trough in the position shown in Fig. 2, it can be readily rotated so as to readily dump anything contained therein. By preventing the dumping of the trough until it is withdrawn, a large part of the material dumped will be deposited in the aisle of the car where it can very readily be removed. The remainder is dropped upon the floor of the coop where it can readily be raked into the aisle.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:

1. In a poultry-car containing coops at opposite sides of an aisle having trough-insertion openings in their frames at the aisle, partition members between adjacent coops in the same tier, guides carried by said members, a trough slidable through one of said openings, a slide slidable on said guides, means for hingedly mounting the outer end of said trough on said slide, and a groove in said trough engaging one of said guides for preventing said trough from being turned until it is partially withdrawn from the coop.

2. In a poultry-car containing coops at opposite sides of an aisle having trough-insertion openings in their frames at the aisle, partition members between adjacent coops in the same tier, guides carried by said members, a slide slidable on said guides, a trough pivotally mounted on said slide to turn about a longitudinal axis and means engaging one of said guides for preventing said trough from being turned until it is partially withdrawn.

3. In a poultry-car containing coops at opposite sides of an aisle having trough-insertion openings in their frames at the aisle, a guide mounted between adjacent coops and having a longitudinal leg, a slide slidable on said leg, a trough hingedly mounted on said slide and means on said trough for engaging said guide to prevent the trough from turning.

4. In a poultry-car containing coops at opposite sides of an aisle having trough-insertion openings in their frames at the aisle, a guide mounted between adjacent coops and having a longitudinal leg, a slide slidable on said leg, a trough hingedly mounted on said slide and a groove on said trough for engaging said guide to prevent the trough from turning.

5. In a poultry-car containing coops at opposite sides of an aisle having trough-insertion openings in their frames at the aisle, a guide mounted between adjacent coops and having a longitudinal leg, a slide slidable on said leg, a trough hingedly mounted on said slide and a groove on said trough engaging said guide for preventing the trough from turning when the trough is pushed in, said groove being disengaged from said guide when the trough is withdrawn a predetermined amount.

GEORGE F. HAUF.